(12) United States Patent
Grundmann

(10) Patent No.: US 6,742,631 B2
(45) Date of Patent: Jun. 1, 2004

(54) SECONDARY PART OF A LINEAR MOTOR, METHOD FOR THE PRODUCTION THEREOF, LINEAR MOTOR WITH SECONDARY PART AND USE OF THE LINEAR MOTOR

(75) Inventor: Steffen Grundmann, Bonstetten (CH)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 10/346,282

(22) Filed: Jan. 17, 2003

(65) Prior Publication Data

US 2003/0106746 A1 Jun. 12, 2003

Related U.S. Application Data

(63) Continuation of application No. PCT/CH01/00441, filed on Jul. 16, 2001.

(30) Foreign Application Priority Data

Jul. 17, 2000 (EP) .............................................. 00810626

(51) Int. Cl.$^7$ .............................................. B66B 13/02
(52) U.S. Cl. ...................................... 187/315; 187/276
(58) Field of Search ................................ 187/250, 316, 187/313, 317, 315, 289, 276, 277; 310/12, 13, 14; 318/135

(56) References Cited

U.S. PATENT DOCUMENTS

| | | | |
|---|---|---|---|
| 4,857,786 A | * 8/1989 | Nihei et al. ............ 310/156.38 |
| 4,859,974 A | 8/1989 | Kliman et al. |
| 5,450,050 A | * 9/1995 | Ban et al. .................... 335/306 |
| 5,801,462 A | * 9/1998 | Yagoto et al. ................. 310/12 |
| 5,808,381 A | * 9/1998 | Aoyama et al. .............. 310/12 |
| 5,949,036 A | * 9/1999 | Kowalczyk et al. ........ 187/316 |
| 6,104,108 A | * 8/2000 | Hazelton et al. .............. 310/12 |
| 6,326,708 B1 | * 12/2001 | Tsuboi et al. ................. 310/12 |
| 6,467,584 B2 | * 10/2002 | Yamamoto et al. ......... 187/316 |
| 6,570,273 B2 | * 5/2003 | Hazelton ..................... 310/12 |
| 2003/0063687 A1 | * 4/2003 | Kim ........................... 375/297 |

FOREIGN PATENT DOCUMENTS

| | | |
|---|---|---|
| JP | 11122904 | 4/1999 |
| WO | WO/96/24189 | 8/1996 |

* cited by examiner

*Primary Examiner*—Jonathan Salata
(74) *Attorney, Agent, or Firm*—MacMillan, Sobanski & Todd, LLC

(57) ABSTRACT

A secondary part of a linear motor, for use in an elevator installation, includes a frame having a plurality of free spaces formed therein, each of the free spaces being surrounded by an inner surface of the frame, at least one magnet positioned in an associated one of each of the free spaces, each magnet having at least one end face spaced from the inner surface, and an adhesive material filling a space between the end surface and the inner surface wherein the magnet is selectively positionable in the associated free space prior to gluing of the magnet to the frame by the adhesive material. The secondary part can be used in a linear motor having: a first primary part, a further part being one of a secondary primary part and an iron element, and the secondary part disposed between the first primary part and the further part. A method of producing the secondary part involves forming a frame having a plurality of free spaces therein, each of the free spaces being surrounded by an inner surface of the frame, positioning at least one magnet in an associated one of each of the free spaces, the magnets being sized smaller than the associated free spaces to provide a space between a side surface of each magnet and the inner surface surrounding the associated free space, and filling the space with an adhesive material to glue each magnet to the frame.

16 Claims, 4 Drawing Sheets

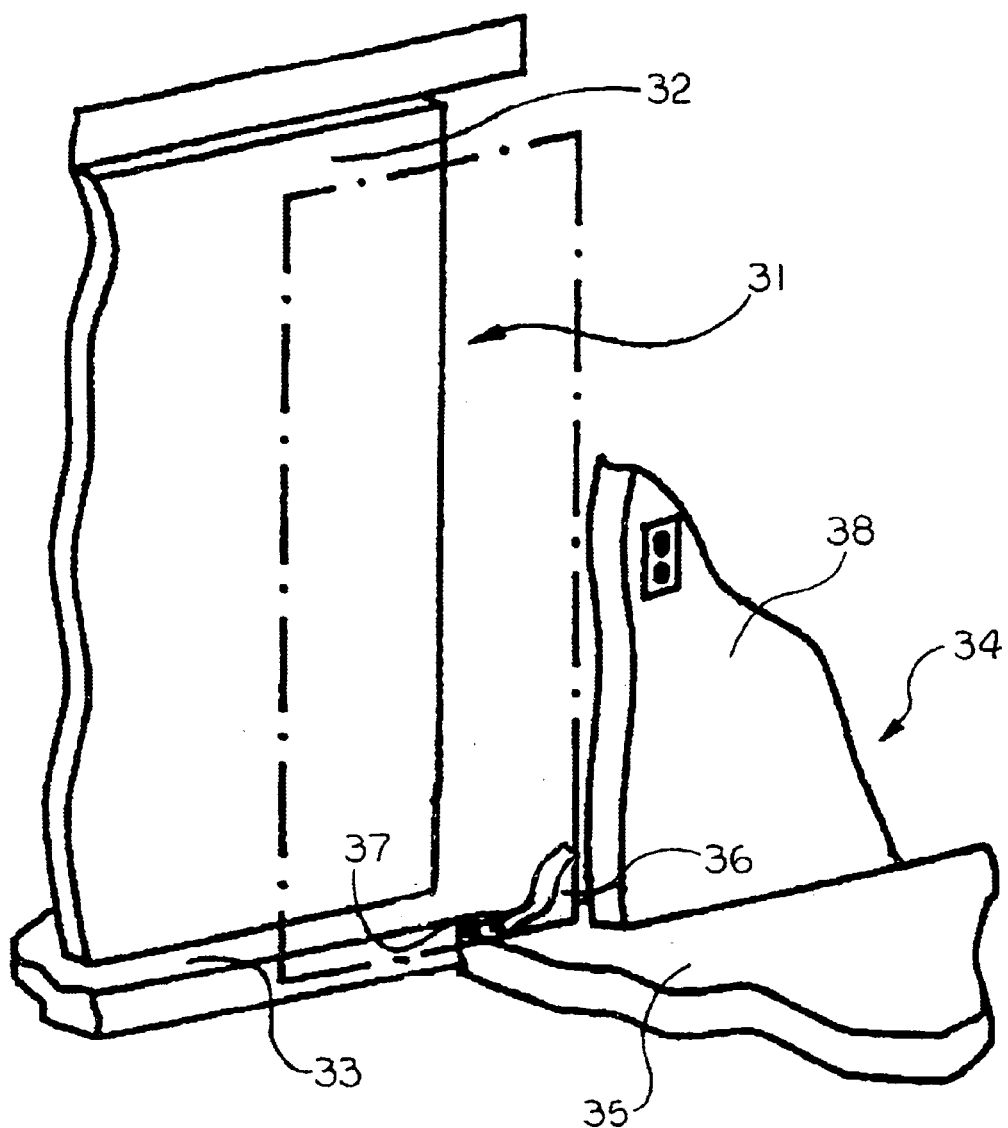

SECONDARY PART OF A LINEAR MOTOR, METHOD FOR THE PRODUCTION THEREOF, LINEAR MOTOR WITH SECONDARY PART AND USE OF THE LINEAR MOTOR

This is a continuation of application No. PCT/CH01/00841 filed Jul. 16, 2001.

BACKGROUND OF THE INVENTION

The present invention relates to a secondary part of a linear motor of an elevator installation, a method for producing the secondary part and a linear motor with such a secondary part.

There is shown in the publication WO-96/24189 a synchronous linear motor with a secondary part which consists of a ferromagnetic solid carrier plate with permanent magnets glued in place. The permanent magnets are glued on with the assistance of positioning structures on the support plate. This method of gluing, however, is relatively expensive. The dimensions of the magnets usually have relatively large tolerances due to the production process. Large changes, which are difficult to manage, arise during sintering of the magnet material. The more accurately the magnets are produced, the more expensive they are. Moreover, the problems with tolerances exist with the known methods.

SUMMARY OF THE INVENTION

The present invention concerns a secondary part of a linear motor, particularly for use in an elevator installation, including: a frame having a plurality of free spaces formed therein, each said free space being surrounded by an inner surface of the frame; at least one magnet positioned in an associated one of each of the free spaces, each said at least one magnet having an upper surface, a lower surface and at least one end face, the at least one end surface facing and being spaced from the inner surface surrounding the associated free space; and an adhesive material filling a space between the at least one end surface of the at least one magnet and the inner surface surrounding the associated free space, the at least one magnet being selectively positionable in the associated free space prior to gluing of the at least one magnet to the frame by the adhesive material. The secondary part can be used in a linear motor having: a first primary part; a further part being one of a secondary primary part and an iron element; and the secondary part disposed between the first primary part and the further part.

A method according to the present invention involves producing a secondary part of a linear motor including the steps of: forming a frame having a plurality of free spaces therein, each of the free spaces being surrounded by an inner surface of the frame; positioning at least one magnet in an associated one of each of the free spaces, the magnets being sized smaller than the associated free spaces to provide a space between a side surface of the at least one magnet and the inner surface surrounding the associated free space; and filling the space with an adhesive material to glue each of the at least one magnet to the frame.

The present invention has an object of providing a secondary part of a linear motor, a method for the production thereof and a linear motor with the secondary part, which do not exhibit the above-mentioned disadvantages and which allow a simple and compact mode of construction subject to tolerances.

A further advantage is that the secondary part, and thus also the linear motor, can be produced economically.

A further advantage is that a carrier plate is not needed for gluing the magnets in the frame.

Of further advantage is the fact that two functions are possible with a single frame, i.e. the frame can both position and support the magnets.

All explained features are usable not only in the respectively indicated combination, but also in other combinations or individually without departing from the scope of the present invention.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 9 is a fragmentary perspective view of a prior art elevator installation showing an elevator car at a building floor.

DESCRIPTION OF THE PREFERRED EMBODIMENT

Figure 1:
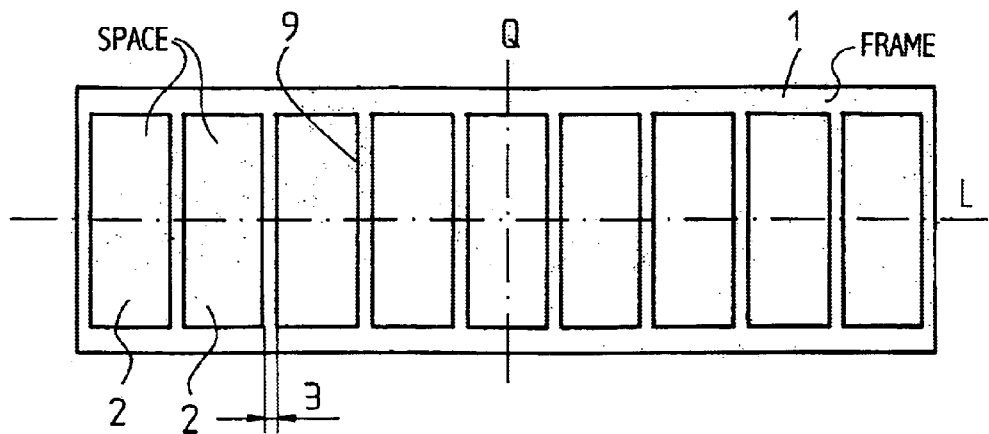
FIG. 1 is a plan view of a frame of a secondary part according to an embodiment of the present invention.

FIG. 1 shows, for example, a solid frame 1 which has an elongated form with a longitudinal axis L and a transverse axis Q and consists of a non-magnetic material. The longitudinal axis L and the transverse axis Q form a plane E, which is termed movement direction plane E in the following description. The frame 1 is constructed as a lattice and has several mutually adjacent free spaces 2 of equal size. The free spaces 2 are of rectangular form and spaced apart at the same spacing 3. The free spaces 2 serve for the purpose of receiving permanent magnets 4 such as shown in FIG. 2.

Figure 2:
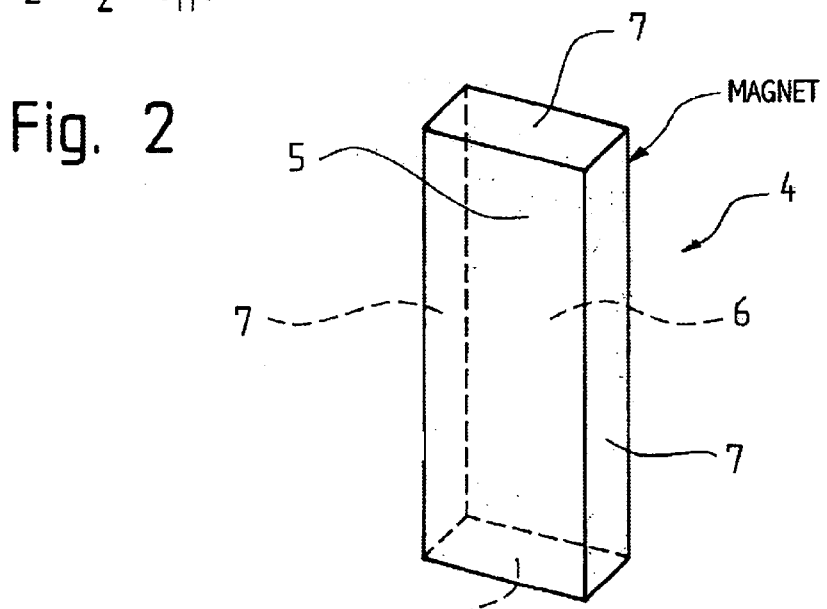
FIG. 2 is a perspective view of a permanent magnet according to an embodiment of the present invention.

In FIG. 2 there is illustrated the permanent magnet 4 of rectangular form, which has an upper surface 5, a lower surface 6 and four side surfaces 7. The permanent magnet 4 is so constructed that it matches one of the free spaces 2 of the frame 1 and can be inserted therein.

Figure 3:
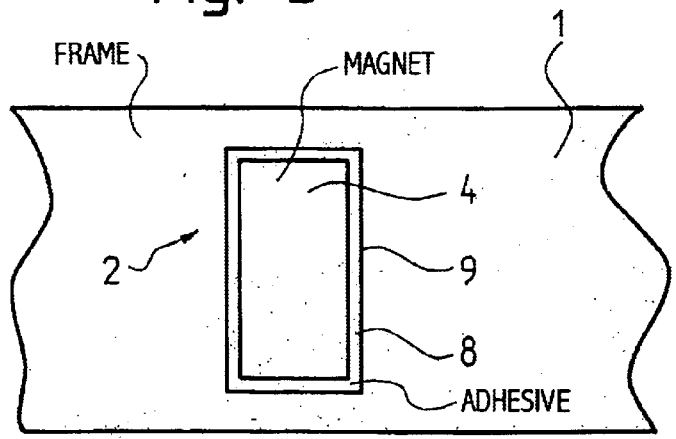
FIG. 3 is a plan view of the permanent magnet according to FIG. 2.

FIG. 3 shows the permanent magnet 4 in plan view, the magnet being arranged in a free space 2 of the frame 1, which here is shown partially. The permanent magnet 4 is provided at its side surfaces 7, also termed end faces 7 in the following, with an adhesive material 8. The permanent magnet 4 is glued into the free spaces 2 at an inner surface 9 of the frame 1 by the adhesive 8. The permanent magnet 4 is thus glued by its end faces 7 to the frame 1 and enclosed by the latter. The adhesive 8 automatically serves to compensate for dimensional tolerances of the permanent magnets 4, which are due to the production process, for example through sintering. The permanent magnets 4 can, in fact, have dimensional tolerances which can be pronounced. Possible gaps between the frame 1 and the permanent magnet 4 are filled by the adhesive 8. The permanent magnet 4 is thus positioned in the correct place relative to the frame 1.

The permanent magnet 4 is preferably glued exclusively at its end faces 7 to the inner surfaces 9 of the frame 1.

The frame 1 has not only a load bearing, but also a positioning function and determines the accuracy of the magnet positioning. In fact it represents an abutment for the gluing in place and/or against displacement or rotation of the permanent magnets 4. The critical positioning of the permanent magnets 4 is thus solved in this way in an elegant manner.

The satisfactory and exact positioning of the permanent magnets 4 in the secondary part of a linear motor plays an important role for the satisfactory and efficient functioning of the linear motor itself. The position of each of the permanent magnets 4 arranged adjacent to one another has an influence on the constancy of the forces between the movable and the stationary parts which are to ensure the linear motion. If the magnets are incorrectly positioned, the electromagnetic forces involved are not constant over time, which leads to a non-uniform linear motion of the linear motor.

In another embodiment, which is not shown here, a thin metal or synthetic material foil could also be provided under the frame 1, the permanent magnets 4 optionally being able to be similarly fastened thereto.

The frame 1 can, for example, be produced in one piece. In another embodiment the frame 1 need not be solid, but could be produced from two sheet metal parts.

Figure 4:
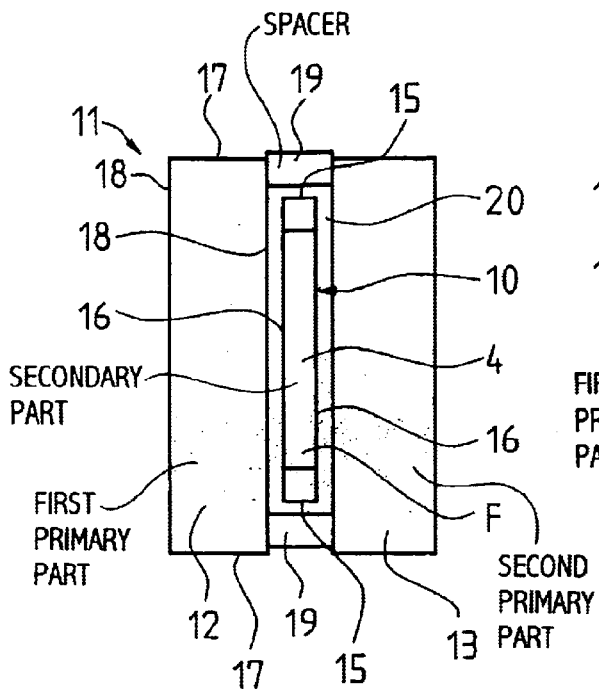
FIG. 4 is a side elevation view of a part of a linear motor according to a first embodiment of the present invention.
Figure 5:
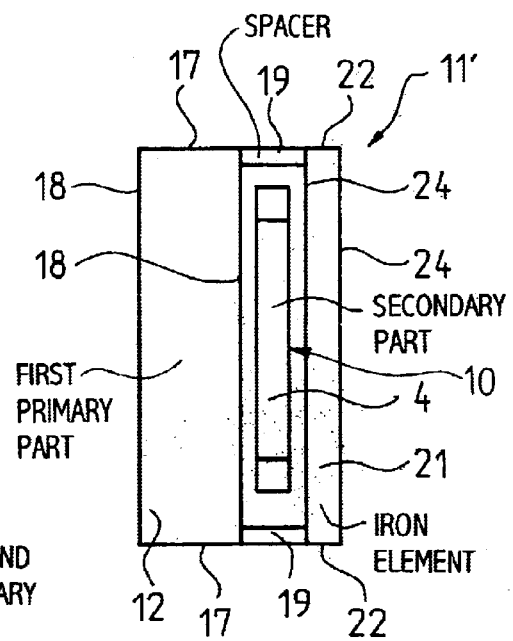
FIG. 5 is a side elevation view of a part of a linear motor according to a second embodiment of the present invention.

The construction, which is produced by the insertion and end face gluing of all permanent magnets 4 in the free spaces 2 of the non-magnetic frame 1, thus the frame 1 with the permanent magnets 4 glued in place, forms a non-magnetic, preferably coreless secondary part 10 of a linear motor 11, 11' as shown in FIGS. 4 and 5.

The most important steps of the method for production of the secondary part 10 are explained in the following:

The permanent magnets 4 are provided at at least one of their end faces 7 with the adhesive 8, are then inserted into the free spaces 2 of the frame 1 and finally are glued to the inner surface 9 of the frame 1.

A constructional variant of the linear motor 11 according to the present invention is illustrated in part in FIG. 4. The linear motor 11, preferably a synchronous linear motor, comprises a first primary part 12 and a secondary primary part 13, between which is arranged, without connection, the coreless secondary part 10 with the permanent magnets 4. This linear motor 11 is also termed a double stator motor. Seen in cross-section, the secondary part 10 has a rectangular surface F, which is formed by two opposite narrow sides 15 and two opposite wide sides 16. The first primary part 12 is also of rectangular form in cross-section and also has two opposite narrow sides 17 and two opposite wide sides 18. The second primary part 13 has, in this embodiment, the same construction as the primary part 12.

The first primary part 12 and the second primary part 13 are spaced apart by two spacers 19, which are positioned in the vicinity of the narrow sides 15 of the secondary part 10 and separated therefrom. The spacers 19 are preferably fastened in the vicinity of the narrow sides 17 of the first primary part 12 and the second primary part 13 to the wide sides 18, which face the secondary part 10, of the first primary part 12 and the second primary part 13. There is thus created a connection between the first primary part 12 and the second primary part 13 which allows the two primary parts 12, 13 to be able to move together. A constant spacing between the two primary parts 12, 13 is ensured by the spacers 19, which provides a satisfactory and optimum functioning of the entire linear motor 11. The spacers 19 thus also take over the function of accepting the forces of attraction between the two primary parts 12, 13. The spacers 19 are so dimensioned that an air gap 20, which for satisfactory and optimum functioning of the entire linear motor 11 similarly shall always remain constant, is between the first primary part 12 and the secondary part 10 and between the second primary part 13 and the secondary part 10.

The first primary part 12 and the second primary part 13 have windings which are not shown and which are supplied with power by an energy source, which is similarly not shown. By virtue of the electromagnetic interaction between the primary parts 12, 13 and the secondary part 10 a linear motion of the primary parts 12, 13 along the secondary part 10 and substantially parallel thereto, or conversely, takes place, wherein the linear motion is effected perpendicularly to the surface F of the secondary part 10, i.e. parallel to the movement direction plane E. The described motion represents a movement direction B of the linear motor 11 and, in FIG. 4, extends perpendicularly to the plane of the sheet.

The linear motor 11', preferably a synchronous linear motor, thus a second embodiment of the invention, is evident in part from FIG. 5. This linear motor 11' essentially comprises the same elements as the linear motor 11 of FIG. 4. Thus, like elements are denoted by the same reference symbols as in FIG. 4.

In this embodiment the linear motor 11' comprises the first primary part 12, which is provided with not-illustrated windings, and an element 21, which serves as a magnetic short-circuit member and preferably consists of iron. The element 21 is termed an iron element 21 in the following. The secondary part 10 is disposed in unconnected manner between the first primary part 12 and the iron element 21. The iron element 21 has, in cross-section, a rectangular form with two opposite narrow sides 22 and two opposite wide sides 24. The wide sides 24 of the iron element 21 are of the same length as the wide sides 18 of the first primary part 12. Through the spacers 19, the iron element 21 is firmly connected with the first primary part 12 in the vicinity of the narrow sides 22 of the iron element 21 and the narrow sides 17 of the first primary part 12. The iron element 21 is entrained by the first primary part 12. In this embodiment the spacers 19 are respectively fastened to the wide sides 18 and 22, which face the secondary part 10, of the first primary part 12 and the iron element 21, respectively. Large attraction forces between the first primary part 12 and the iron element 21 arise transversely to the movement direction plane in this variant, but are predominantly accepted by the spacers 19.

The forces arising through the electromagnet interactions between the first primary part 12, the secondary part 10 provided with the permanent magnets 4 and the iron element 21 generate a linear motion of the first primary part 12 together with the entrained iron element 21 in the movement direction B and substantially parallel to the secondary part 10, or conversely.

The linear motor 11' has, with the construction according to FIG. 5, an even more compact construction than the linear motor 11.

Since the primary parts 12, 13 or the iron element 21 move parallel to the secondary part 10 in the movement direction B or conversely, lateral fluctuations perpendicularly to the movement direction plane E cannot be avoided. So that these lateral fluctuations cannot arise, i.e. so that no risk exists that a side of the primary part 12, 13 or of the iron element 21 can come into contact with the secondary part 10 and vice versa, slide guides are needed between the two elements. The slide guides can at the same time and additionally to the spacers 19 accept the forces of attraction between the two primary parts 12, 13 or between the first primary part 12 and the iron element 21, which improves the functional capabilities and the stability of the entire linear motor 11, 11'.

Figure 6:
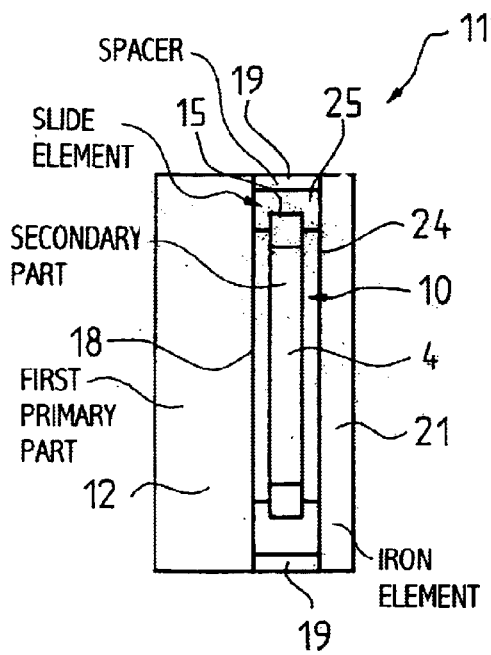
FIG. 6 is a side elevation view of a part of a linear motor according to FIG. 5 with slide guides.

A variant of the guidance in the case of the embodiment according to FIG. 5 is shown in FIG. 6. A U-shaped slide element 25 is fastened in the vicinity of the spacers 19 and to the wide sides 18 and 24, which face the secondary part 10, respectively of the first primary part 12 and the iron element 21 and are arranged to be displaceable around the two narrow sides 15 of the secondary part 10. The slide element 25 is preferably fastened to the first primary part 12 and to the iron element 21, as they are normally shorter than the secondary part 10. The slide element 25 thus forms, together with the frame 1, a slide guide. The surface of the slide element 25 facing the secondary part 10 is used as slide surface.

In a preferred variant, the slide element 25 consists of POM, i.e. polyoxymethylene, or of polytetrafluoroethylene. In a preferred embodiment, the slide element 25 is so constructed that it slides only at the edge of the frame 1.

The slide material 25 could obviously be fastened to the narrow sides 15 of the secondary part 10 and be arranged to be displaceable relative to the first primary part 12 or the iron element 21. In this case, the surface of the slide element 25 facing the first primary part 12 or the iron element 21 is used as slide surface.

The same construction of the slide guide according to FIG. 6 can also be used in the variant of the linear motor 11 according to FIG. 4 and accordingly a specific description is redundant here. In this case, too, the slide element 25 can preferably be fastened to the primary parts 12, 13 and slide on the secondary part 10, or conversely.

Figure 7:
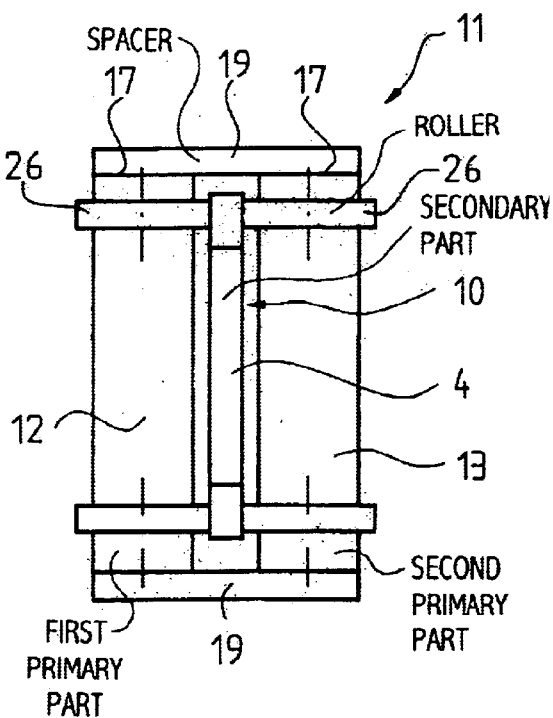
FIG. 7 is a side elevation view of a part of a linear motor according to a third embodiment of the present invention.

A further possible variant of the guide of the linear motor 11 in accordance with the embodiment according to FIG. 4, thus a double stator motor, is shown in FIG. 7. The same elements are denoted by the same reference symbols as in FIG. 4. The spacers 19 are, in this case, firmly connected respectively with the narrow sides 17 of both primary parts 12, 13 and extend over a length which is at least twice as large as that of the narrow side 17. Four rollers 26 are, for example, provided as guides between the primary parts 12, 13 and the secondary part 10. The rollers 26 are arranged at the primary parts 12, 13 and stand in operative connection with the frame 1 of the secondary part 10. The rollers 26 are so arranged that they can roll on edges 27, shown in FIG. 8, which edges face the spacers 19, of the secondary part 10 in the movement direction B. The edges 27 of the secondary part 10 are the parts of the frame 1 which extend at the edge of the permanent magnets 4 in the movement direction B and do not have the permanent magnets 4. This means that in FIG. 8 the edges 27 are the regions above and below the permanent magnets 4. The permanent magnets 4 of the secondary part 10 are thus not only undamaged, but also unimpaired in their usual function.

Figure 8:
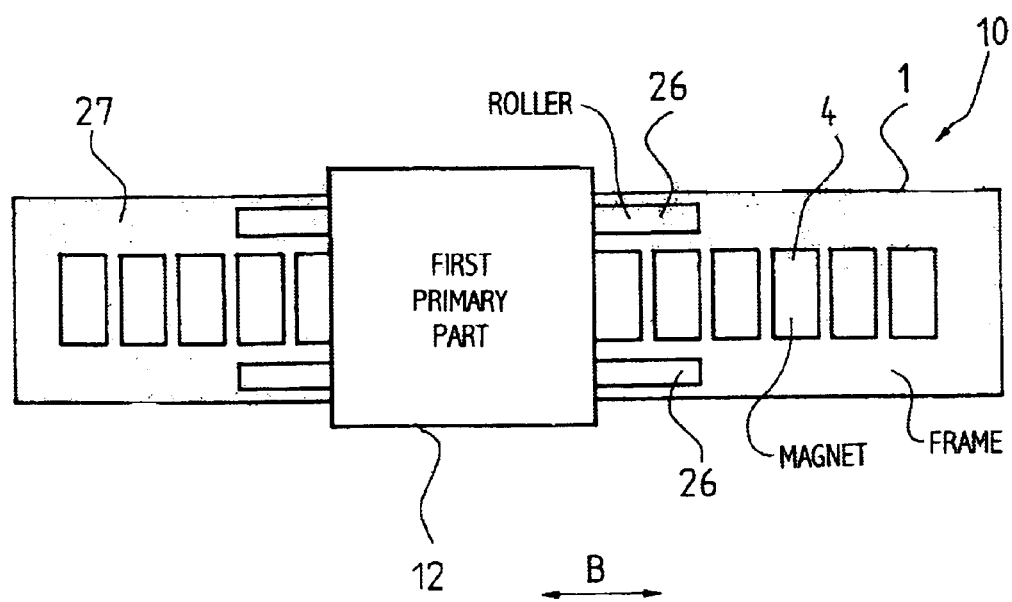
FIG. 8 is a plan view of the linear motor according to FIG. 7.

FIG. 8 shows a plan view of the linear motor 11 according to FIG. 7, wherein the frame 1 and the permanent magnets 4 of the secondary part 10 are clearly apparent as well as the first primary part 12 with the rollers 26 which slide along the secondary part 10 parallel to the movement direction plane E.

The linear motors 11, 11' according to the invention are preferably permanent magnet synchronous linear motors, which are used especially for the drive of an elevator car or an elevator door.

There is shown in FIG. 9 a typical prior art elevator installation having an elevator car 31 with at least one sliding car door panel 32 mounted at a car door threshold 33. The car 31 is positioned at a stop serving a building hallway 34 having a building floor 35. A floor door panel 36 is slidably mounted at a floor door threshold 37 in an opening in a hallway/shaft wall 38 for entrained movement with the car door canal 32. In the case of use of the linear motor 11, 11' according to the invention for the drive of elevator doors, the primary parts are normally arranged at the door panels 32 and the secondary part 10 is fixedly attached to the car 31 or to the floor 35 of a building. The linear motor 11, 11' causes the motion of the primary parts on the secondary part 10 and thus the opening and closing of the sliding doors 32 and 36 of the elevator.

The primary parts can obviously be fixedly attached to the car 31 or the floor 35 of a building and the secondary part 10 can be arranged at the door panel 32. In this case, the secondary parts are moved in the movement direction B in order to open or close the sliding doors 32 and 36 of the elevator.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A secondary part of a linear motor, particularly for use in an elevator installation, comprising:
   a frame having a plurality of free spaces formed therein, each said free space being surrounded by an inner surface of the frame;
   at least one magnet positioned in an associated one of each of said free spaces, each said at least one magnet having an upper surface, a lower surface and at least one end face, said at least one end surface facing and being spaced from said inner surface surrounding said associated free space; and
   an adhesive material filling a space between said at least one end surface of said at least one magnet and said inner surface surrounding said associated free space, said at least one magnet being selectively positionable in said associated free space prior to gluing of said at least one magnet to said frame by said adhesive material.

2. The secondary part according to claim 1 wherein said frame has an elongate form.

3. The secondary part according to claim 1 wherein each said at least one magnet is glued exclusively at side surfaces including said at least one end surface to said frame.

4. The secondary part according to claim 1 wherein said frame performs at least one of a load-bearing function and positioning function of the linear motor.

5. The secondary part according to claim 1 wherein said frame is constructed as a lattice with said free spaces forming openings of the lattice and each said at least one magnet being arranged in the lattice.

6. The secondary part according to claim 1 wherein said frame is constructed of a solid material.

7. The secondary part according to claim 6 wherein said frame is constructed of at least one sheet of metal material.

8. The secondary part according to claim 1 wherein each said at least one magnet is a permanent magnet.

9. A linear motor with a said secondary part according to claim 1 further comprising: a first primary part; a further part being one of a secondary primary part and an iron element; and a secondary part disposed between said first primary part and said further part.

10. The linear motor according to claim 9 including at least one spacer spacing said first primary part from said further part.

11. The linear motor according to claim 9 wherein said first primary part includes at least one winding.

12. The linear motor according to claim 9 wherein said first primary part, said further part and said secondary part are configured to operate as a permanent magnet synchronous motor.

13. The linear motor according to claim 9 wherein said further part is one of a magnetic short-circuit member and said second primary part including at least one winding.

14. The linear motor according claim 9 wherein the linear motor functions as an elevator door drive with said first primary part and said further part adapted to be fastened to an elevator door and said secondary part adapted to be attached to one of an elevator car and a floor of a building.

15. The linear motor according claim 9 wherein the linear motor functions as an elevator door drive with said first primary part and said further part adapted to be attached to one of an elevator car and a floor of a building and said secondary part adapted to be fastened to an elevator door.

16. The linear motor according to claim 9 including at least one of a slide element and a roller engaging said first primary part, said further part and said secondary part.

\* \* \* \* \*